Sept. 28, 1954

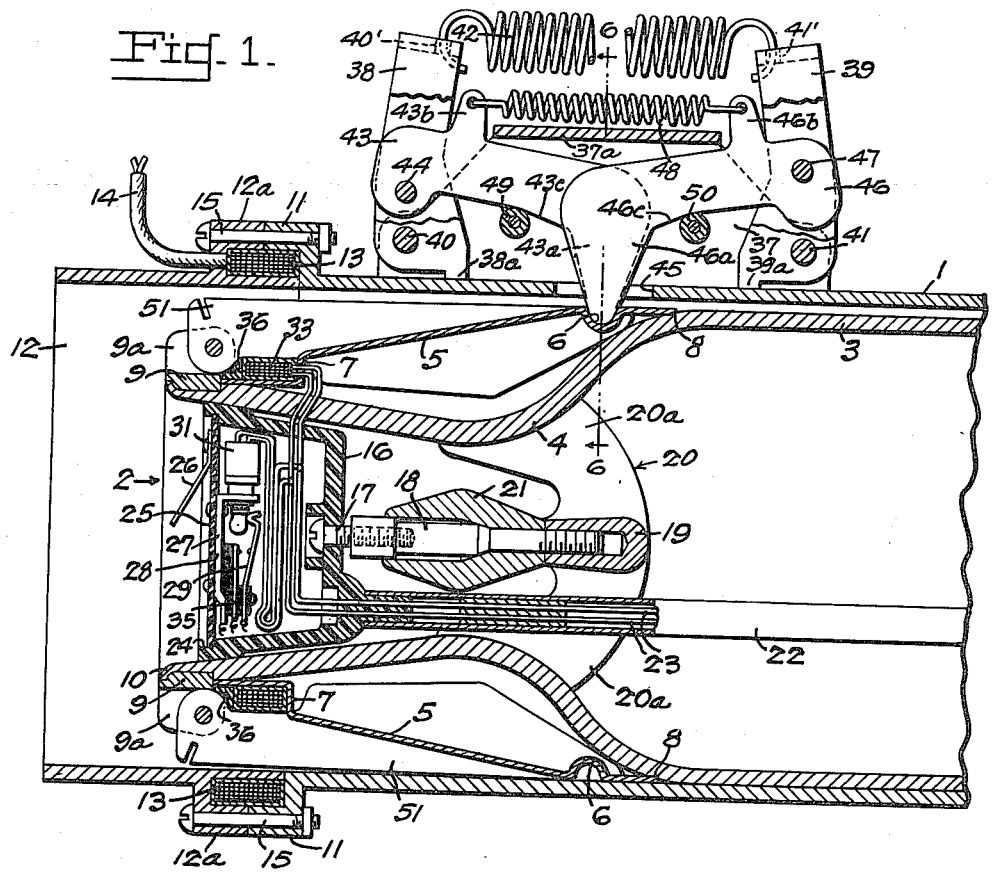

J. M. MELICK 2,690,124

INDUCTION FIRING MEANS FOR ROCKETS

Filed Oct. 19, 1950

Inventor
John M. Melick

By G. J. Kessenich, J. H. Church & A. W. Dew
Attorneys

Sept. 28, 1954    J. M. MELICK    2,690,124
INDUCTION FIRING MEANS FOR ROCKETS
Filed Oct. 19, 1950    3 Sheets-Sheet 3
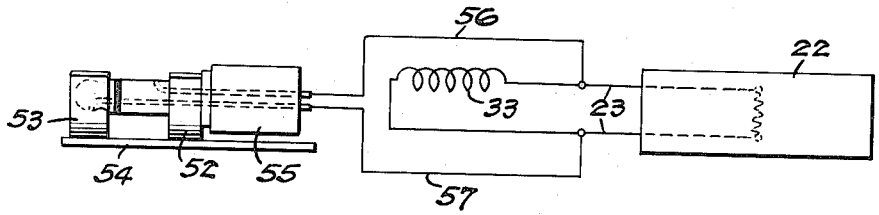
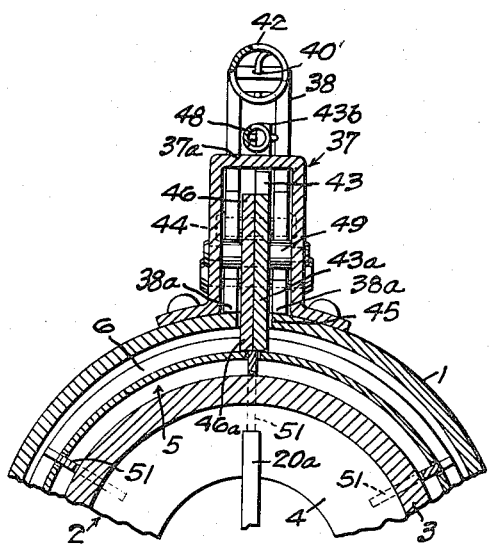
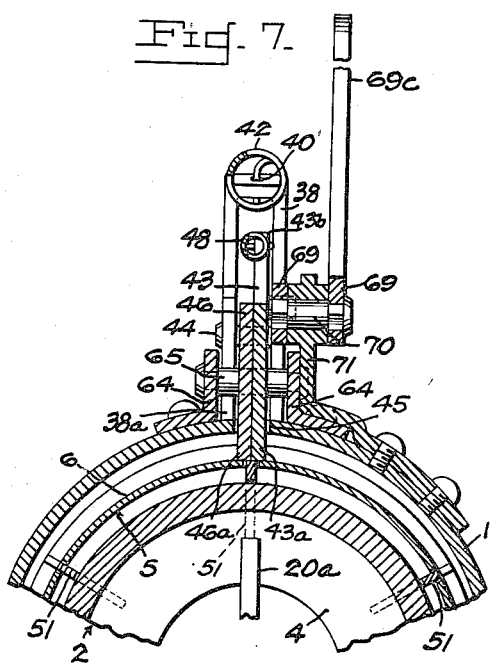
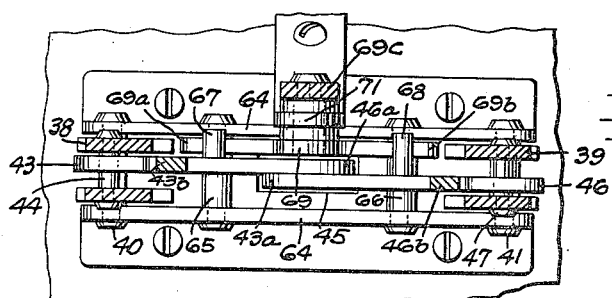
Inventor
John M. Melick
By
G. J. Kessenich, J. H. Church & A. W. Dew
Attorneys Patented Sept. 28, 1954

2,690,124

UNITED STATES PATENT OFFICE 2,690,124

INDUCTION FIRING MEANS FOR ROCKETS

John M. Melick, Cresskill, N. J., assignor, by mesne assignments, to the United States of America as represented by the Secretary of the Army Application October 19, 1950, Serial No. 190,916

2 Claims. (Cl. 102—49)

This invention relates to self-propelled missiles and to launching means therefor. Prior to this invention when a rocket was to be fired electrically, it was necessary to make positive electrical connection with the rocket from a source of voltage, after the rocket had been loaded into the launcher tube. This was usually done by swinging two wire contact arms to rest under spring pressure against two brass rings on the igniter in the rear end of the rocket. In another type of firing hook-up two wires from the igniter of the rocket were fastened to clip type terminals on the launcher. With both hook-ups, contamination or corrosion of the contact surfaces was common and resulted in poor contacts and misfires. Also it required an excessive amount of time to make the connections so that firing in combat was appreciably slowed.

It is therefore the principal object of the invention to provide a combination of rocket and launcher wherein the rocket may be fired by induction and without external wiring connections.

Another object is to provide a combination as in the preceding paragraph in which the rocket and launcher have means to enable muzzle or breech loading while coacting to positively locate and releasably maintain the rocket in correct firing position within the launcher tube, that is, in position with the inductive elements in proper relation for induction firing.

Another object is to provide a rocket which can be fired by induction but which can also be fired by the direct application thereto of an external voltage source.

A further object is the provision of a rocket firing mechanism in which a removable plug within the rocket can be readily removed to plug into a socket external of the rocket when direct voltage firing is to be carried out.

Yet another object is the provision of a rocket launcher in which the axial thrust of the rocket incidental to firing operates to release the rocket for unobstructed launching movement along the tube.

Other objects and advantages of my invention will be apparent after a study of the following detailed description had in connection with the accompanying drawings.

In these drawings:

Fig. 1 is an axial sectional view of rear portion of the launcher tube and rocket, the latter being adapted for firing either by induction or by direct electrical connection with an external voltage source.

Fig. 2 is a view similar to Fig. 1 of a corresponding portion of a modified form of rocket adapted to be electrically fired either by induction or by direct connection with a source of voltage.

Figure 3:
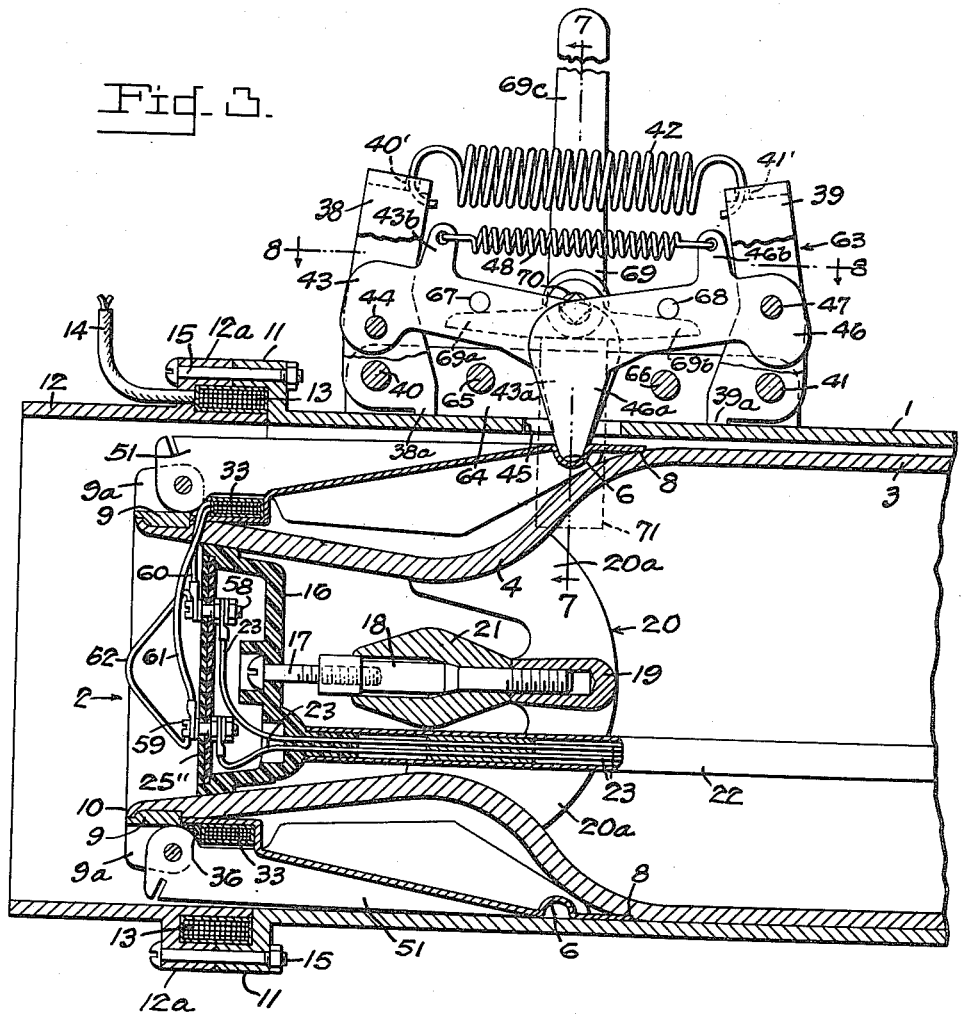
Figure 4:
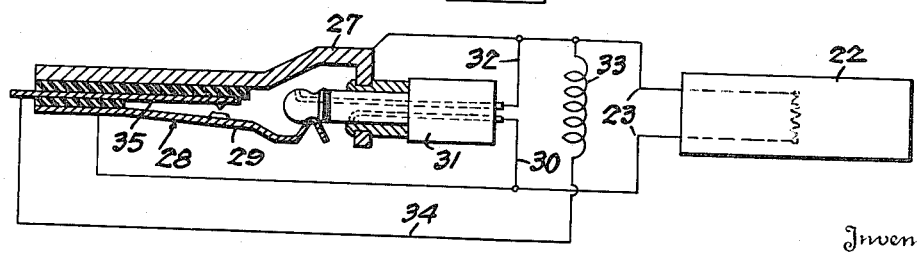

Fig. 3 is a view in axial section of the rear portion of a launcher tube and rocket adapted for induction firing and manual release, Fig. 4 is a wiring diagram of the circuit in the species of Fig. 1, Fig. 5 is a wiring diagram of the circuit in the species of Fig. 2, and Figs. 6, 7 and 8 are cross sections taken in planes identified by the lines 6—6, 7—7 and 8—8, of Figs. 1, 2 and 3, respectively.

Referring in detail to the species disclosed at Fig. 1, the numeral 1 identifies the rear end of a launcher tube within which is mounted for firing, a rocket generally identified by the numeral 2 and comprising the usual casing 3 constricted as at 4 to form a Venturi-type discharge passage. The rocket is provided externally with a generally frusto-conical cowling 5 having a peripheral locating groove 6 at its forward end, and a radially inwardly extending shoulder 7 at its rearward end. Cowling 5 at its forward end abuts a shoulder 8 formed on casing 3, and at its rearward end engages and is held rigidly in position by a ring 9. As clearly shown upon the figure, the ring is held in position by spinning or otherwise outwardly turning at 10 a thin terminal portion of casing 3 into interfitting relation with the ring, whereby both ring and cowling are firmly fixed to casing 3. The portion of cowling 5, rearward of shoulder 7, is generally cylindrical and carries externally, a secondary coil 33 which coil is held firmly against the shoulder by a filler ring 36 wedged between the casing or envelope of coil 33 and ring 9. Alternatively, rings 9 and 36 may be formed integrally. In a well-known construction, ring 9 carries integral, circumferentially-spaced flanges 9a to each of which is pivoted a vane 51 for movement from the folded positions shown, to a flight position radially of the casing. Cowling 5 has spaced slots through each of which a respective vane extends when in the folded position.

The end of launcher tube 1 terminates in a radially outwardly and rearwardly extending flange 11 adapted to mate with the flanged end 12a of an auxiliary tubular breech portion 12 to form an annular enclosed channel adapted to contain a primary induction coil 13 having external leads 14. The axially-extending flanged portions 11 and 12a are rigidly united by through bolts 15. Tube portion 12 may be of non-magnetic material.

An igniter cup 16 of plastic or other fusible material, fits snugly within the throat of the discharge passage and is held in position by a machine screw 17 passing centrally through an aperture in the bottom of the cup and threaded into the end of rod 18 which, in turn, is threaded into and supported by the central or hub portion 19 of spider 20. This spider, as shown, has four radial arms or flanges such as 20a whose ends fit the curvature of constriction 4 and are secured thereto in any suitable manner. Rod 18 supports gas-flow control member 21 for sliding movement rearwardly thereon in response to excessive pressures in casing 3. Inasmuch as this construction forms no part of my invention and is, moreover, fully explained in the patent to Hickman, 2,460,289, dated February 1, 1949, it is unnecessary to describe it further. Suffice it to say that control member 21 is forced rearwardly on its spindle on rod 18, only in response to excessive pressure within the casing 3, to thereby increase the effective throat area of the constriction 4 and thus relieve or reduce the excessive pressure. Igniter tube 22 is secured to and extends forwardly from a peripheral portion of the base of cup 16 and is conventionally provided with igniter wires 23 which when connected with an external voltage source, not shown, form a circuit for igniting the powder within the tube to thereby ignite the main propelling charge within casing 3.

In order to provide a hook-up which will permit firing, either by connection of the igniter to a source of voltage external of the rocket, or by induction, while at the same time, for reasons of safety, will maintain the induction coil open until the rocket is to be fired, I have provided the rim of cup 16 with an internal shoulder 24. A disc 25 of dielectric material has a snug fit within the rim of the cup and, as shown, seats against the shoulder. A tab 26 is provided on the disc for convenience in pulling it out of the cup.

A single contact jack 28 has its base 27 riveted to the forward face of disc 25. As shown upon Fig. 4, one lead or wire 23 from igniter tube 22, extends to the spring arm 29 of the jack. This wire is also connected by lead 30 with the base of the plug 31. The other wire 23 is connected with bracket 27 and, through lead 32, with the nose of the plug. This wire is also connected with one terminal of secondary induction coil 33. A lead 34 connects the remaining terminal of coil 33 with the fixed contact 35 of jack 28. By this construction, when it is desired to fire the rocket by the direct application to the igniter tube of an external voltage source, after loading, disc 25 is pulled out, plug 31 is removed from the jack, and inserted into a socket associated wih tube 1 and connected to a voltage source under control of an appropriate switch. The igniter wires are then in circuit with the source and the rocket may be fired by closing the switch. When induction firing is to be used, the plug is removed as previously and the jack operates through contact arm 29, to connect wires 23 and 34 thereby placing the igniter and secondary coil 33 in series. Then when an alternating or pulsating voltage is applied to the terminals of primary coil 13, the current induced in the circuit of the secondary fires the igniter and the propelling charge of the rocket. When the plug is in the position shown, the secondary circuit is held open and the firing of the rocket by an accidentally induced voltage is obviated.

Where induction firing is to be used, it is desirable that the primary coil on the launcher and the secondary coil on the rocket, be in optimum inductive relation when the rocket is in loaded and firing position. For this purpose, I have provided on launcher tube 1, mechanism now to be described, to yieldingly and releasably engage in groove 6 in cowling 5 to thereby positively locate the rocket in proper position within the launcher and releasably hold it in such position until fired. For this purpose a mounting member 37 is secured as by welding or riveting to the external surface of tube 1. This member consists of two spaced generally parallel side portions only one of which is shown upon Fig. 1, interconnected at the top by an integral bridge portion 37a. See Fig. 6. A pair of substantially identical levers 38 and 39 are pivoted at 40 and 41, respectively, between the parallel portions of member 37. Each lever is generally inverted U-shaped in transverse vertical cross section and the bight portions thereof are apertured as at 40' and 41', respectively, to receive the ends of a spring 42 by which the levers are urged into opposite directions of rotation. Such rotation beyond the limiting positions shown upon Fig. 1, is prevented by stop portions 38a and 39a each of which engages the surface of tube 1, as will be clear from inspection of the figure.

A first rocket-engaging arm 43 is pivoted at 44 between the parallel portions of lever 38. This arm has a bent portion 43a extending downwardly through a slot 45 in tube 1 and provided with a rounded end or nose adapted to fit and engage in groove 6. Arm 43 also has an upwardly extending apertured lug 43b. A second rocket-engaging arm 46 is pivoted at 47 between the side portions of lever 39 and has a downwardly-extending end 46a also extending through slot 45 in side-by-side relation with portion 43a and adapted to engage in groove 6 of cowling 5. This arm 46 also has an upwardly extending apertured lug 46b. Lugs 43b and 46b are urged toward each other by a spring 48, whereby the nose or end portions of arms 43 and 46 are yieldingly urged into locating groove of rocket cowling 5 when the rocket is located in firing position in tube 1, that is, when coil 33 is substantially coplanar with or otherwise inductively positioned with respect to coil 13. While arms 43 and 46 are shown as identical in form, it will be noted that pivots 44 and 47 are not symmetrically positioned. That is, the separation of pivots 41 and 47, is greater than that of pivots 44 and 46. The purpose of this will be subsequently explained.

A pair of rollers 49 and 50 are journaled on pins secured in and extending between the side walls of member 37. Roller 49 is positioned to cooperate with a cam edge 43c on arm 43 while roller 50 similarly cooperates with a cam edge 46c on arm 46.

In use, the rocket may be loaded either from the muzzle or breechward end of tube 1. In the former case, as the rocket is about to move into the position shown, the nose of arm 46 is cammed upwardly by engagement with the surface of cowling 5 against the tension of spring 48. At the same time the cowling engages the nose of arm 43 and moves the latter bodily to the rear. This movement is accompanied by a counter-clockwise pivoted movement of lever 38 about its pivot 40, and against the tension of spring 42. As the arm 43 so moves, its cam edge 43c co-operates with roller 49 to cam the nose portion 43a out of groove 6. Then, as the rocket moves into loading position, the nose portion of both arms move into the groove 6 and act to releasably hold the rocket in firing position with coils 13 and 33 in inductive relation. Loading from the rear or breech is analogous to the action just described, arm 43 being directly cammed upwardly by the rocket surface and arm 46 being moved forwardly and simultaneously upwardly through interaction between cam edge 46c and roller 50.

When the rocket is in firing position, disc 25 is pulled out and plug 31 is removed from the jack, thus effecting contact between arm 29 and contact plate 35. If induction firing is to be used, wires 30 and 32 are cut and the plug discarded. A source of alternating voltage is then applied to the terminals, not shown, of coil 13 and the resulting current induced in the secondary circuit which includes igniter 22, fires the rocket. If firing is to be done by the direct application of a voltage to the igniter circuit, plug 31 is inserted into a socket, not shown, connected with a source of voltage of any type and the igniter is directly energized. It will be understood that the cable or leads from plug 31 are sufficiently long to enable the plug to be inserted into a socket adjacent portion 12 of the launcher. In both methods of firing, the rocket is released by substantially the same action as has been previously described in connection with loading. As levers 38 and 39 are of equal length, the forces required to rotate the two are inversely proportional to the distance between pins 40 and 44, on the one hand, and pins 41 and 47 on the other. This permits different release values forward and rearward. Due to the fact that the igniter circuit is held open until plug 31 is removed, accidental firing is prevented.

The rocket shown at Fig. 2 is identical with the one shown upon Fig. 1 and the same reference numerals have been used to identify corresponding parts. Hence it is deemed unnecessary to repeat the previous description. However, disc 25', Figs. 2 and 5, carries short circuiting clips 52 and 53 secured to a common metal base 54. The two leads 56 and 57 from the plug extend to and are connected with respective leads from coil 33 to igniter 22. Thus, when plug 55 is in the position shown, coil 33 is short-circuited and firing of the rocket by a current accidentally induced in the secondary coil, is prevented. As in the case of Fig. 1, the hook-up of Fig. 2 enables either induction or direct firing. When induction firing is to be employed, plug 55 is pulled out, its lead wires cut and the plug discarded. When direct firing is employed, plug 55 is inserted into a socket, not shown, connected with a source of voltage, as in the case of Fig. 1.

In Fig. 3 I have shown a third modification wherein the launcher tube and rocket are generally of the same construction as in Fig. 1 and like numerals have been used to identify corresponding parts. In this modification, cup 16 is provided with a dielectric disc 25'' having binding posts 58 and 59 secured thereto. Posts 58 and 59 are connected externally with leads 60 and 61 from secondary coil 33 while post 59 is connected with the other lead 61 from coil, and on the inner side with leads or igniter wires 23. A clip or shorting wire 62 has its ends inserted in holes in the heads of posts 58 and 59 to thereby short circuit the coil and prevent accidental firing of the rocket. In firing the rocket, wire 62 is pulled out, this rendering the igniter tube subject to firing by an induced voltage in coil 33. Although no specific provision is made for firing by the direct application of a voltage to the igniter tube wires, such firing may be effected by the application of clips or other electrical connections from a source of voltage to the respective binding posts.

The means shown at Fig. 3, generally identified by the numeral 63, for releasably locating and maintaining the rocket in proper firing position within the launcher tube, is a little different from that shown in Fig. 1. Levers 38 and 39, arms 43 and 46, and springs 42 and 48 are shown as identical with the correspondingly numbered parts on Fig. 1. However, pivot pins 40 and 41 are carried by and extend between a pair of angle sections only one of which 64 is shown upon the figure. These angle sections are bolted or welded to tube 1 so that their upstanding portions are parallel and spaced by an amount sufficient to receive levers 38 and 39 between them with a smooth fit. A pair of through bolts or rivets 65 and 66 serve to rigidly unite the sections 64 in spaced relation.

Arms 43 and 46 are provided with lugs 67 and 68, respectively, which, as shown, are symmetrically positioned and adapted to be engaged by the upper edges of respective arms 69a and 69b of a double-armed bellcrank 69 pivoted at 70 and having an upstanding operating arm 69c. Pivot 70 may be carried by a bracket 71 secured to tube 1 independently of 64, or it may be formed as an integral part of one of elements 64. Thus, by operating arm 69c clockwise as viewed in Fig. 3, arm 43 is pivoted to move its end portion 43a out of groove 6. Counterclockwise movement of arm 69c similarly moves arm 46 to move its end portion out of groove 6. In this way, the rocket may be manually released at the instant of firing.

It is contemplated that secondary winding 33 may be made in the form of two oppositely wound or "bucking" windings, whereby an incidental or accidental stray field adjacent the rocket will induce equal and opposite voltages in the windings and will not cause accidental firing, while readily permitting the induction therein of voltages by proper energization of the primary winding.

It will now be evident that I have provided a combination of launcher and rocket which permits loading of the rocket from either end of the tube, releasably but positively locates and holds the rocket in firing position within the tube, and permits firing either by induction or by direct application of a source of voltage. Where induction firing is used, there is no wiring connection between the rocket and tube and loading and firing may be performed rapidly and efficiently.

While I have shown a preferred form of the invention this should be taken in an illustrative sense as it is my desire and intention to reserve all modifications and substitutions of equivalents provided they fall within the scope of the subjoined claims.

Having now fully disclosed the invention, what I claim and desire to secure by Letters Patent is:

1. In an induction fired rocket, a generally cylindrical rocket casing terminating in a rearwardly and axially directed Venturi propulsion nozzle, a generally frusto-conical cowl fitting at its larger and smaller ends about said casing and the rearward end of said nozzle, respectively, there being an external annular channel in said cowl adjacent its larger end and an induction coil fixedly mounted on said cowl at its smaller end in coaxial relation thereabout, the axial distance between said groove and coil being fixed and predetermined.

2. In an induction fired rocket, a generally cylindrical rocket casing terminating in a rearwardly directed Venturi propulsion nozzle coaxial of said casing, a generally frusto-conical cowl having its larger end fitting externally about the rearward end of said casing and its rearward end fitting about the rearward end of said nozzle, said cowl having an external annular channel adjacent its forward end and terminating rearwardly in a cylindrical extension of reduced diameter defining a rearwardly-facing shoulder, an induction coil fixed about said extension, coaxially of said cowl, and a vane ring secured coaxially about the rearward end of said nozzle and confining said cowl in position on said casing and said coil against said shoulder, the spacing between said coil and said channel in a direction axially of said cowl being fixed and predetermined.

References Cited in the file of this patent

UNITED STATES PATENTS

| Number | Name | Date |
| --- | --- | --- |
| 1,739,921 | Schuler et al. | Dec. 17, 1929 |
| 2,430,636 | Gould | Nov. 11, 1947 |
| 2,459,854 | Swift | Jan. 25, 1949 |
| 2,461,574 | Skinner et al. | Feb. 15, 1949 |

FOREIGN PATENTS

| Number | Country | Date |
| --- | --- | --- |
| 3,761 | Great Britain | of 1889 |
| 864,373 | France | Jan. 17, 1941 |
| 402,680 | Italy | Mar. 18, 1943 |